Oct. 28, 1941.  J. LEDWINKA  2,260,997
DOOR FOR CLOSED VEHICLES, ESPECIALLY FOR AUTOMOBILES
Filed Aug. 16, 1938  2 Sheets-Sheet 2
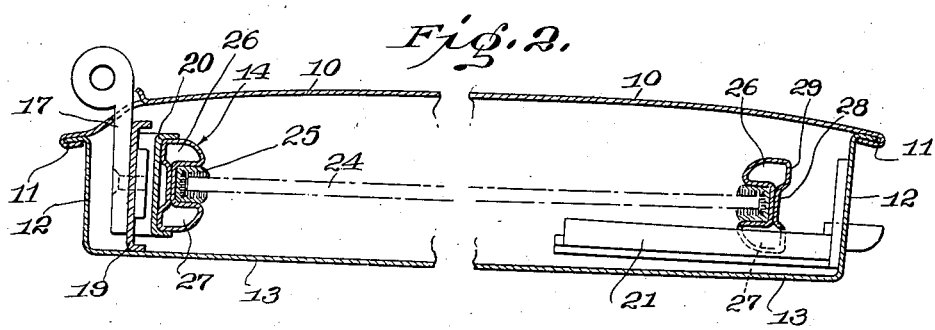
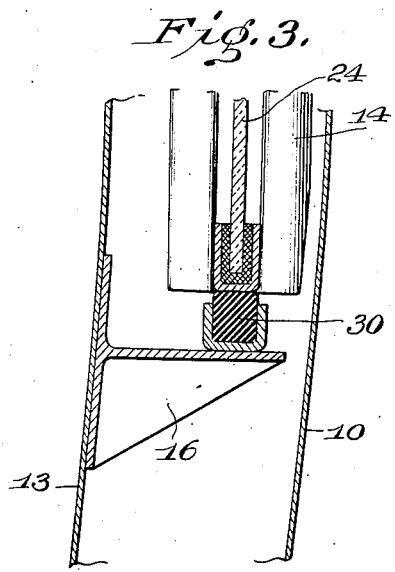
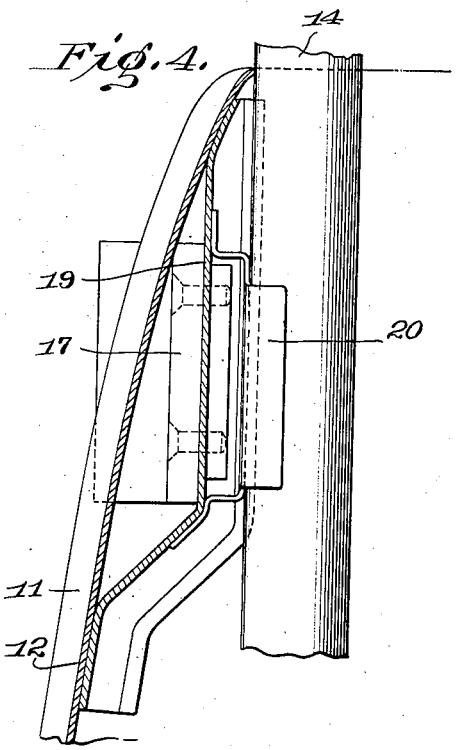
INVENTOR:
Joseph Ledwinka
BY
ATTORNEY Patented Oct. 28, 1941

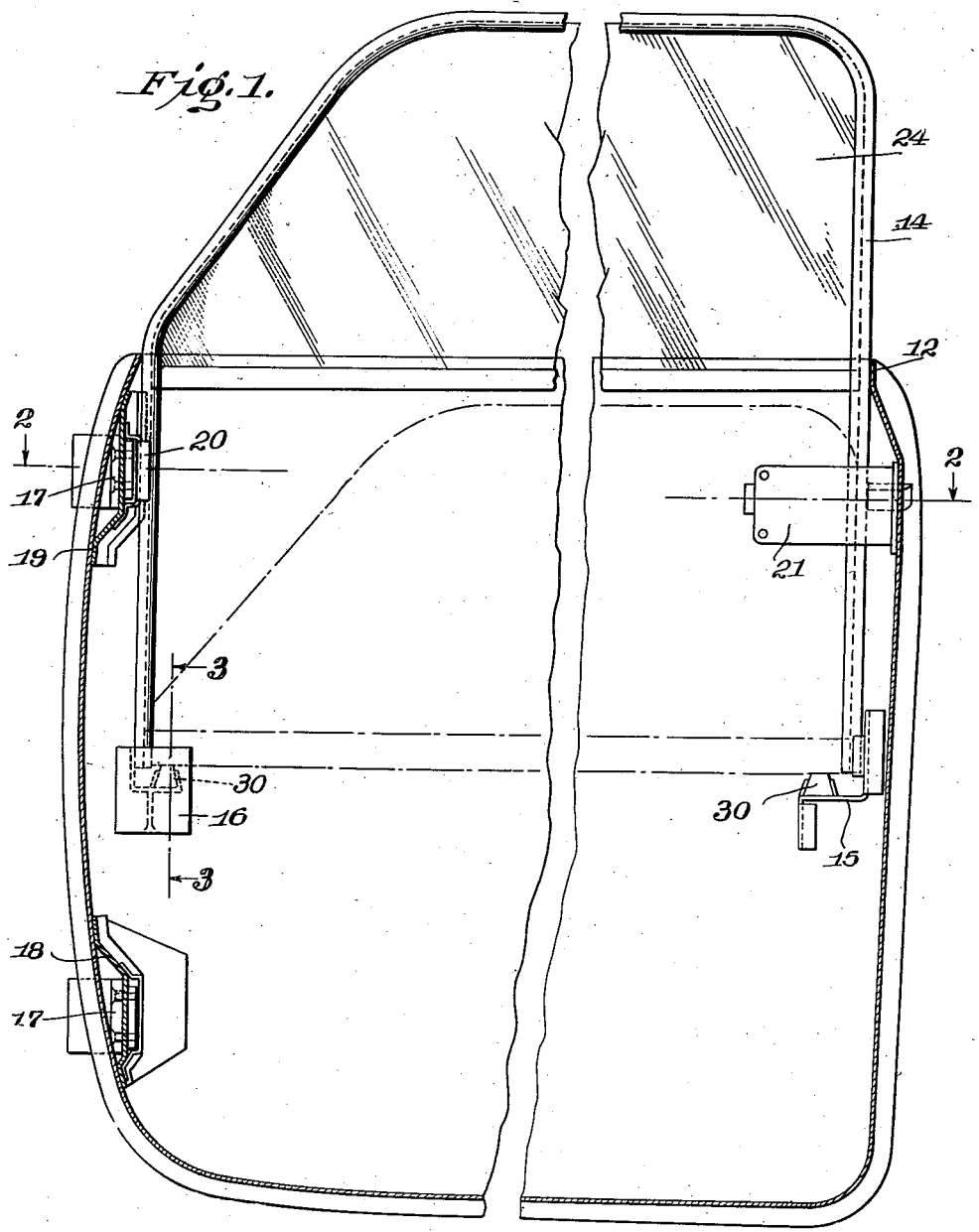

2,260,997

UNITED STATES PATENT OFFICE 2,260,997

DOOR FOR CLOSED VEHICLES, ESPECIALLY FOR AUTOMOBILES

Joseph Ledwinka, Philadelphia, Pa., assignor to Edward G. Budd Manufacturing Co., Philadelphia, Pa., a corporation of Pennsylvania Application August 16, 1938, Serial No. 225,089
In Germany August 20, 1937

3 Claims. (Cl. 296—44)

The invention refers to a door, especially for automobiles, with a lower part extending up to the lower edge of the window opening and a window guide bow projecting thereabove. Doors of this kind as known until now have the disadvantage that the window guide bow projecting above the lower part is not of sufficient strength. As a consequence it may happen more easily with doors of this kind than with doors provided with a strong framework enclosing the window opening that the glass panes are broken when the door is slammed shut or by other shocks.

It is an object of the invention to retain the advantages of such door with a lower part and an upper window guide bow, which consist particularly in simple design, low weight and full sight, but to avoid the mentioned disadvantage of insufficient strength of the window guide bow.

The invention consists in the window guide bow consisting of a hollow profile or even several parallel hollow profiles. This may at the same time have the additional advantage of better appearance.

Further characteristics of the invention consist in the details of construction of the window guide bow as well as in anchorage of the bow in the lower part of the door.

An embodiment of the invention is shown in the attached drawings.

Fig. 1 is an inside plan view of the door, whereby the inner panel with the inner sections of the frame rails are omitted;

Fig. 2 shows a section through the door along line 2—2 of Fig. 1;

Fig. 3 shows a section along line 3—3 of Fig. 1;

Fig. 4 shows on a larger scale the upper hinge connection of the door shown in Fig. 1;

Fig. 5 shows a section through a slightly changed window guide bow.

The lower part of the door comprises an outer panel 10. The edges of this panel are flanged around flanges 11 of the frame rails 12 of the door and may be welded to these flanges. The frame rails 12 are bent off from the inner door panel 13. A bow-like window guide 14 is fastened with its lower ends inside of the door to brackets 15, 16, which on their part are fastened to the inner panel 13, for example by welding. At the place where the guide bow projects from the lower part of the door it is fastened, for example by welding, with the webs 12 of the door frame and with the edges of a slit provided in the upper wall of the door. The door hinges 17 are carried by brackets 18, 19 welded to the frame board 12. The upper bracket 19 on its part is also holding the one arm of guide bow 14 by means of an intermediate piece 20. The opposite arm of bow 14 is cut out on its inner side for a short distance so as to accommodate lock 21. At the place where the lock is located it will be well to reinforce bow 14 by parts not shown on the drawings and to fasten it thereby to the inner panel 13 or to the frame rail 12.

The window pane 24 is kept in bow 14 by means of the usual tightening strip 25 consisting of rubber, felt or the like. On both sides of window pane 24 the bow shows boxlike formations 26, 27. The bottom of the window guide channel rests against an impression 28 of outer wall 29 of the bow and it will be useful to connect same by welding. Due to this double boxlike form and the impression 28 the bow is of extraordinary rigidity compared with its weight. Impression 28 may further be used for locating a strip for tightening the space between the upper edges of the door and the rigid door frame.

The movement of the glass pane is limited by elastic bumpers 30 of rubber or the like which are held by brackets 15 and 16. These brackets may simultaneously be used for fastening the lower ends of bow 14.

Many variations of the invention in its details are possible. For example the boxlike profile may only be provided at one side of the glass pane as shown in Fig. 5.

What I claim is:

1. In a vehicle door comprising a window opening, a lower door body extening to the lower margin of said window opening only, a slot in the upper wall of said door body for the passage of a window pane, a bow forming the upstanding side members and the upper member of a frame surrounding said window opening, the upstanding members of said bow extending into the interior of said body through said slot, those extended portions being rigidly fastened to said body in the interior thereof, said bow consisting exclusively of two box sectional sections and a web formed portion, one of said sections being arranged on the outside and the other being arranged on the inside of said window pane, said two sections being rigidly connected by the transverse web-formed portion, said bow being adapted to be easily bent as a finished section into its final configuration.

2. In a vehicle door comprising a window opening, a lower door body extending to the lower margin of said window opening only, a slot in the upper wall of said door body for the passage of a window pane, a bow forming the upstanding side members and the upper member of a frame surrounding said window opening, the upstanding members of said bow extending into the interior of said body through said slot, those extended portions being rigidly fastened to said body in the interior thereof, said bow being a continuous profile rail which is as a finished section bent into the required configuration, said rail consisting of a web portion and additional portions, said web portion extending transversely to the plane of the window and the additional portions extendng substantially exclusively from said web portion toward the middle of the window opening and being mainly arranged outside of the planes defined by the surfaces of the window, at least one of said additional portions presenting a closed box section.

3. In a vehicle door comprising a window opening, a lower door body extending to the lower margin of said window opening only, a slot in the upper wall of said door body for the passage of a window pane, a bow forming integrally the upstanding side members and the upper member of a frame surrounding said window opening, the upstanding members of said bow extending into the interior of said body through said slot, those extended portions being rigidly fastened to said body in the interior thereof, said bow being a continuous box sectional profile rail, which is as a finished section bent into the required configuration, said rail consisting of a web portion and additional portions, said web portion extending transversely to the plane of the window and the additional portions extending substantially exclusively from said web portion toward the middle of the window opening, the box sectional part of the rail being mainly arranged outside of the planes defined by the surfaces of the window.

JOSEPH LEDWINKA.